United States Patent [19]

Blau

[11] Patent Number: 5,015,840
[45] Date of Patent: May 14, 1991

[54] SELF-CHECKING LIGHT CURTAIN SYSTEM AND METHOD OF OPERATION

[75] Inventor: David Blau, Cupertino, Calif.
[73] Assignee: Scientific Technologies Incorporated, Hayward, Calif.
[21] Appl. No.: 463,240
[22] Filed: Jan. 9, 1990
[51] Int. Cl.⁵ .............................................. G01V 9/04
[52] U.S. Cl. .................................. 250/221; 250/208.3; 250/222.1; 340/556
[58] Field of Search ................... 250/208.3, 208.4, 221, 250/222.1; 340/555, 556, 557

[56] References Cited

U.S. PATENT DOCUMENTS

| | | | |
|---|---|---|---|
| 2,900,521 | 8/1959 | Eames | 250/221 |
| 3,025,406 | 3/1962 | Stewart et al. | 250/221 |
| 3,704,396 | 11/1972 | Macdonald | 250/221 |
| 3,746,863 | 7/1973 | Pronovost | 250/221 |
| 3,805,061 | 4/1974 | DeMissimy et al. | 250/208.3 |
| 3,810,148 | 5/1974 | Karsten et al. | 250/221 |
| 4,015,122 | 3/1977 | Rubinstein | 250/221 |
| 4,266,124 | 5/1981 | Weber et al. | 250/221 |
| 4,559,452 | 12/1985 | Igaki et al. | 250/222.1 |
| 4,749,853 | 6/1988 | Salim | 250/221 |
| 4,763,903 | 8/1988 | Goodwin et al. | 250/222.1 |
| 4,818,866 | 4/1989 | Weber | 250/221 |

Primary Examiner—David C. Nelms
Assistant Examiner—Stephone B. Allen
Attorney, Agent, or Firm—Flehr, Hohbach, Test, Albritton & Herbert

[57] ABSTRACT

A light curtain system and method of operation which detects the intrusion of objects into a protected zone. The system is characterized in having an inherent self-checking mode of operation by logic circuits which analyze data signals from both the LED light transmitters and phototransistor receiver circuits. A shutdown signal is generated if the logic circuit determines that light is not received in a selected channel at the time that the LED is strobing light exclusively for that channel. The system further provides a relatively simple and inexpensive method of selecting and amplifying the LED transmitters and PT receivers. In the circuit each PT acts as a switch which selects itself, and a single amplifier is employed for a plurality of the channels. The circuit further provides for the concatenation of groups of amplifier/PT circuits into a longer chain using a single diode.

9 Claims, 5 Drawing Sheets

SELF-CHECKING LIGHT CURTAIN SYSTEM AND METHOD OF OPERATION

FIELD OF THE INVENTION

This invention relates in general to light curtain systems for detecting the movement or intrusion of objects into a protected zone. More particularly, the invention relates to light curtain systems which detect the intrusion of objects in a work place area or in association with an industrial machine.

BACKGROUND OF THE INVENTION

Photosensitive detector systems, commonly known as light curtains, are employed in a variety of industrial applications to sense the intrusion of objects in or around a prescribed area. Light curtains typically are employed for operator protection around machinery such as punch presses, brakes, molding machines, presses, automatic assembly equipment, coil winding machinery, robot operation, casting operations and the like. Conventional light curtain systems employ invisible pulsed infrared light beams which project across the area to be protected. Unintended intrusion of the light beams by an object, such as the operator's hand, are sensed by the circuit to trigger a warning signal, shut the machinery down, or otherwise safeguard the area.

There is a critical requirement to provide a light curtain system which cannot fail unblocked, i.e. in an unsafe mode. Thus, certain governmental regulations concerning industry workers prohibit the use of machinery having a design in which a part can fail unsafe. Conventional light curtain systems have design limitations which can permit them to fail unblocked, making them unsafe for certain applications.

Another problem with conventional light curtain systems is their high degree of complexity and cost. Certain of these systems, such as the Weber U.S. Pat. No. 4,266,124, provide a system which attempts to achieve self-checking operation by using one set of circuits to select individual light receivers and a separate set of additional circuits to verify that the correct receivers are selected. This results in a relatively more complex and costly design.

Conventional light curtain designs employ a light receiver circuit with a series of phototransistors which respond to light signals. Each phototransistor typically is coupled with a single operational amplifier to provide a fast and sensitive circuit, but which on the other hand is relatively complex, expensive and failure prone.

Conventional light curtain systems also typically employ analog circuits to sequentially select the photodetector channels. These circuits produce a relatively unsafe system in that intruding objects may not be properly detected if an incorrect channel is selected such as from a part failure. The system thus would not be intrinsically safe.

OBJECTS OF THE INVENTION

Accordingly, it is a principal object of the present invention to provide an improved light curtain system and method of operation which is intrinsically self-checking in its mode of operation and which employs a relatively simple and inexpensive circuit design.

Another object of the invention is to provide a light curtain system and method of operation of the type described which employs a self-checking safety logic circuit to ensure operation.

Another object is to provide a light curtain system and method of operation which includes a digital logic circuit to verify proper selection of channels during light scanning to ensure self-checking operation.

SUMMARY OF THE INVENTION

The invention in summary provides a light curtain system and method of operation for detecting the intrusion of objects into a zone or area by means of a light transmitter and light receiver, the operation of which are coordinated by control means incorporating a digital logic verification circuit. The control means selects phototransistors to sense the light in a given channel responsive to the light transmitter strobing a light beam which is exclusively addressed for the given channel. The logic verification circuit verifies that the light transmitter is correctly strobing a light beam for the given channel in predetermined timed relationship with selection of the phototransistor in the light receiver. A relay circuit is provided for generating a signal responsive to the light receiver not properly sensing the light beam in a channel at the time the light transmitter is verified as correctly strobing for that channel.

In the preferred embodiment of the invention, the light receiver includes a circuit in which the phototransistors act as switches to select the channels responsive to the control circuit. In the receiver circuit a single amplifier is used in combination with a plurality of phototransistors to amplify the signal for a number of channels.

BRIEF DESCRIPTION OF THE DRAWINGS

The foregoing and additional objects and features of the invention will appear from the following specification in which the several embodiments have been set forth in conjunction with the accompanying drawings wherein.

DESCRIPTION OF THE PREFERRED EMBODIMENTS

Figure 1:
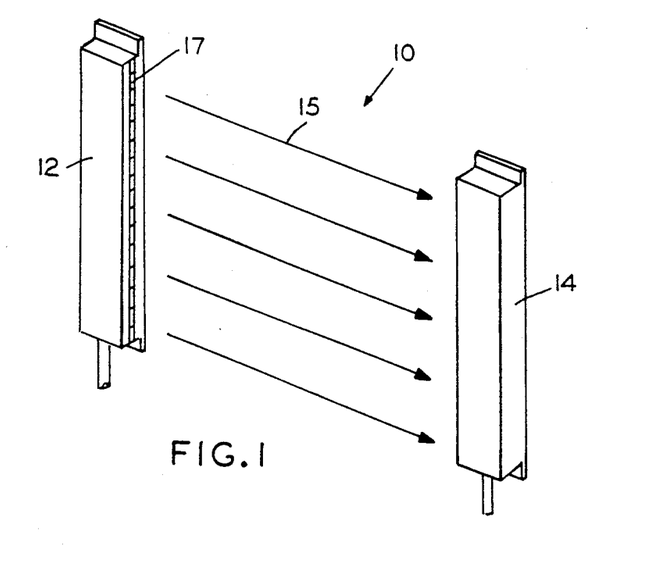
FIG. 1 is a fragmentary perspective view showing the light transmitting and light receiving components of a light curtain system incorporating the invention.

In the drawings FIG. 1 illustrates generally at 10 components of a light curtain system incorporating one embodiment of the invention. The light curtain system includes light transmitting means 12 and light receiving means 14 which are operated by the control system shown generally in the block circuit diagram of FIG. 2. The light transmitting means is comprised of a plurality of light sources, preferably light-emitting diodes (LEDs), which emit pulses of infrared light responsive to the control circuit. The LEDs are mounted on a housing positioned in series along a plane, which typically is a vertical plane. The LEDs are focused by collimating lenses 17 into light beams 15 which project along predetermined paths or channels across the zone or area of the work place which is to be protected.

Light receiving means 14 is comprised of a plurality of phototransistors (PTs) which typically are mounted in series in a housing which is located in the zone across from the housing of the LEDs. Preferably the number of light receiving PTs is equal to the number of light transmitting LEDs, with each PT associated with the LED of a respective channel. At the work place the housings of the light transmitting and light receiving means are installed so that the PTs are substantially in optical alignment with the light beams from the LEDs. While operation of the invention will be described by the use of infrared light, it is understood that the invention contemplates the use of other radiant energy, for example near-infrared or visible light. It is also understood that the invention contemplates that a plurality of light transmitting modules and/or a plurality of light receiving modules may be combined in tandem to protect a relatively large zone or area.

Figure 2:
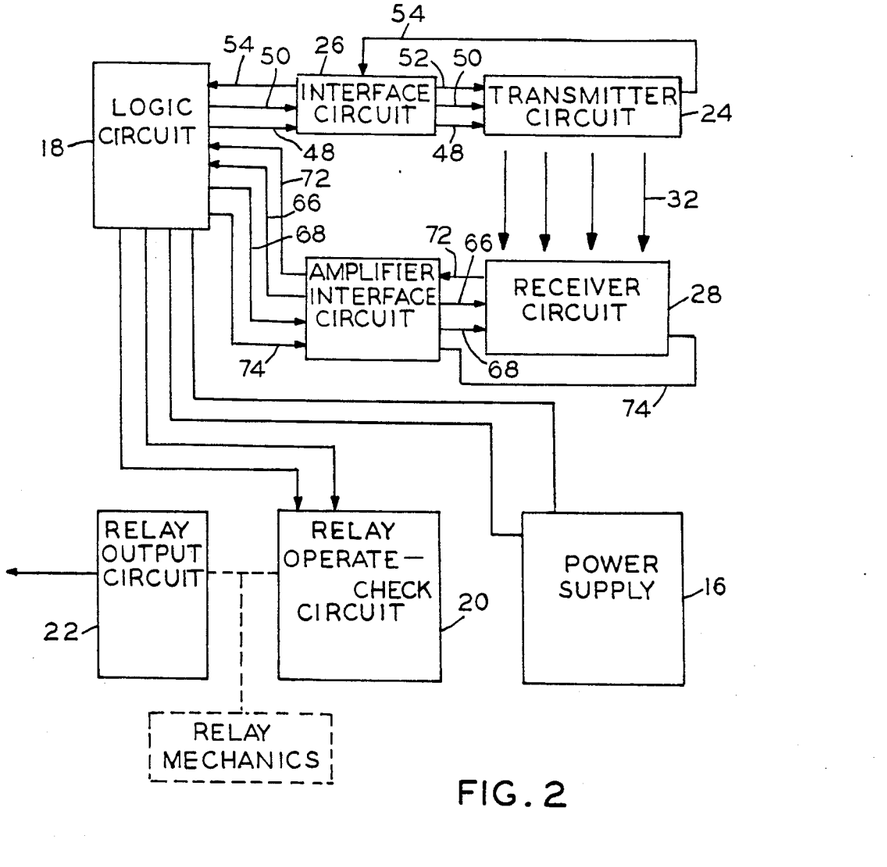
FIG. 2 is a block diagram illustrating the major components of the electrical control system for the light curtain of FIG. 2.

FIG. 2 illustrates the major components of the control circuit in block diagram form. The control circuit includes a power supply 16, logic circuit 18, relay operate/check circuit 20, relay output circuit 22, transmitter circuit 24 which is connected to the logic circuit through an interface circuit 26, and receiver circuit 28 which is connected to the logic circuit through amplifier/interface circuit 30. The lines 32 represent the paths of the light beams which project across the protected zone from the transmitter LEDs to the receiver PTs.

Figure 3:
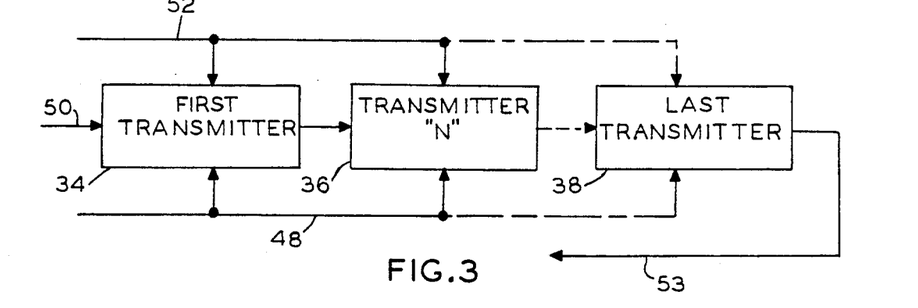
FIG. 3 is a schematic block diagram of the transmitter circuit means.
Figure 4:
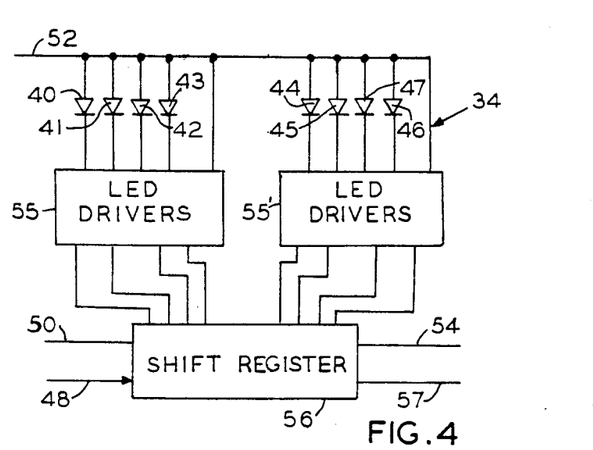
FIG. 4 is a more detailed schematic diagram of the transmitter circuit means.

FIG. 3 illustrates details of transmitter circuit 12 showing a plurality of transmitter blocks 34, 36, 38 concatenated together. Each transmitter block in turn is comprised of a plurality, typically eight, of LEDs 40-47, as shown in FIG. 4 for the first transmitter block 34. In FIG. 3 the total number of transmitter blocks concatenated together would be determined by the size of the zone which is to be protected. The inputs into the transmitter circuit include a clock signal line 48, data-in line 50, LED power control line 52 and data-out line 53 from the last transmitter in the concatenation, all of which are combined in a cable leading from interface circuit 26 into the logic circuit 18.

In each transmitter block, as illustrated in FIG. 4, the LEDs 40-47 are connected in parallel with LED power control line 52. Eight power drivers 55 are provided in the transmitter block, one for each LED. The power drivers are conventional solid state devices which selectively activate their associated LEDs responsive to control signals from a shift register 56, which will be described in detail hereafter. The shift register receives binary data in through line 50 and receives the clock signal through line 48. A data-out line 57 transfers data to the shift register of the next transmitter block in the concatenation, except for the shift register of the last block which loops the data back to the logic circuit via line 53.

Figure 5:
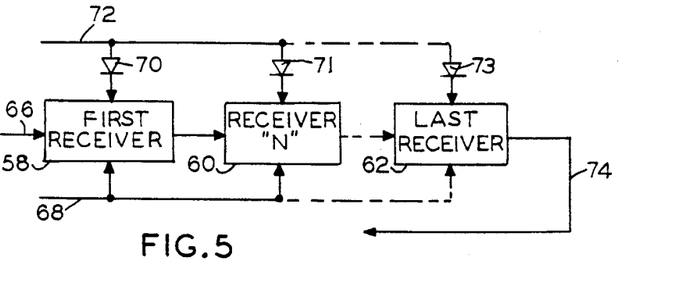
FIG. 5 is a schematic block diagram showing the concatenation of multiple receiver circuits.
Figure 6:
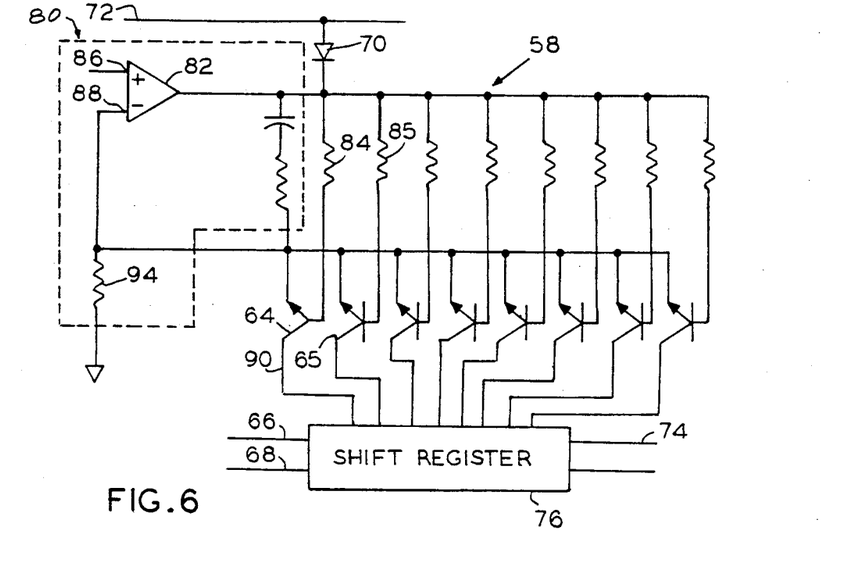
FIG. 6 is a more detailed schematic diagram of the receiver circuit.

FIG. 5 is a block diagram illustrating the concatenation of multiple receiver blocks 58, 60, 62. As shown in FIG. 6, the typical receiver block 58 is comprised of PT sensors 64, 65 corresponding to the number of LEDs in the transmitter block with which it is associated. In the above example, eight PTs are arrayed in each receiver block. The number of receiver blocks in the concatenation will vary in accordance with the number of transmitter blocks, as required by the size of the zone or area to be protected. The data-in signal from the logic circuit is routed through amplifier/interface circuit 30 via line 66 into first receiver block 58. The clock signals from the logic circuit are routed through the amplifier/interface circuit via line 68 into the receiver blocks. The output signals from the receiver blocks are connected with the cathodes of diodes 70 which have their anodes connected to a line 72 that provides the analog output signal back to the logic circuit. The data-out signal from the last receiver 62 is directed through line 74 into amplifier/interface circuit and back to logic circuit 18.

FIG. 6 shows the circuit components for the typical receiver block 58 of FIG. 5. This circuit includes a shift register (SR) 76 having eight terminals, each of which is connected with the collector of a respective one of the eight phototransistors 64, 65. A single amplifier circuit 80 is provided for each receiver block. In the circuit 80 the output terminal of an operational amplifier 82 is connected in parallel through resistors 84 85 with the bases of the PTs. Terminal 86 of the op amp is normally maintained at +2.5 volts. Feedback from the emitters of the PTs is directed into op amp terminal 88.

Figure 7:
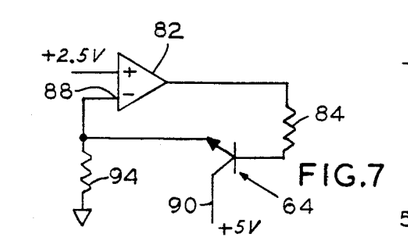
FIG. 7 is a more detailed schematic diagram of components of the receiver circuit showing selection of a phototransistor.

FIG. 7 is a schematic circuit illustrating operation of the phototransistor amplifier combination when the single PT 64 is selected and is also struck by the light beam. The PT is selected by application of a +5 volt signal from shift register 76 through line 90 to the transistor collector. The light input supplies a part of the base current to the PT so that the amplifier does not have to supply as much current through resistor 84. The amplifier output voltage then drops proportional to the light input, thereby providing a light detection signal.

Figure 8:
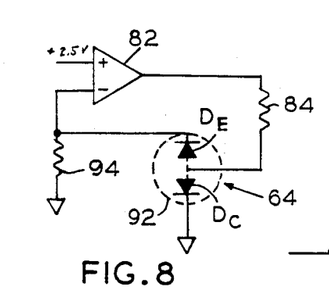
FIG. 8 is a schematic diagram of the components of FIG. 7 showing de-selection of the phototransistor.

FIG. 8 illustrates the mode of operation of the single PT 64 when it is de-selected by means of a signal from shift register 76 grounding the collector of the transistor. In this mode the PT functions in the manner of a virtual pair of diodes, represented as $D_c$ and $D_e$ within the broken line circle 92 of the diagram. This grounding of the collector eliminates the photosensitivity of the transistor and drops its base voltage $V_B$ to approximately 0.6 volts. With all of the PTs de-selected in this manner, amplifier 82 tries to maintain the voltage across resistor 94 by going as positive as it can. The virtual diode Dc keeps $V_B$ at approximately 0.6 volts so that virtual diode $D_e$ is reverse-biased and there is no feedback. The amplifier output then goes to the positive power supply rail. The de-selected PTs therefore act as if disconnected from the circuit.

Figure 9:
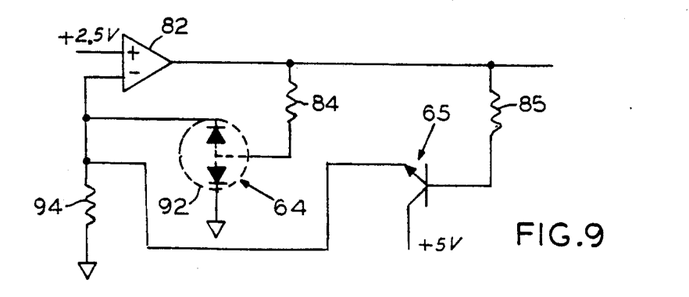
FIG. 9 is a detailed schematic diagram of components of the receiver circuit showing one phototransistor selected and another phototransistor de-selected.

FIG. 9 illustrates schematically the mode of operation in which one PT 64 is de-selected and at least one additional PT 65 is selected. The PT 64, represented by the virtual pair of diodes within dashed line circle 92, is de-selected by the signal from shift register 76 grounding its collector. At the same time PT 65 is selected by a +5 volt signal from the shift register. PT 65 is then the only source of feedback to resistor 94 so that the output of amplifier 82 reflects only the light which strikes PT 65. When the collector of PT 65 is grounded and the +5 volt signal is applied to the collector of PT 64, then PT 64 will supply the feedback and PT 65 will be disabled.

Figure 10:
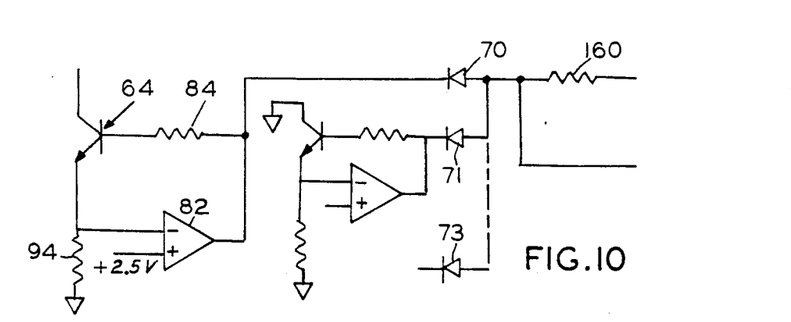
FIG. 10 is a detailed schematic diagram of components of the receiver circuit showing the combination of multiple amplifiers on a single analog output line.

The amplifier/PT circuits which comprise the receiver blocks of FIGS. 5 and 6 can be concatenated with additional receiver blocks into longer chains using single diodes 70, 71, and 73 by means of the circuit of FIG. 10. Assuming that all of the PTs for a single amplifier 82 are de-selected, and that the positive input of the amplifier is at 2.5 volts, then the negative input does not receive current because all of the PTs are in the off mode so that the negative input of amplifier 82 goes to 0 volts. The output of the amplifier thus goes to +15 volts which is the positive supply rail. Assuming that PT 64 is then selected by applying the +5 volt signal to its collector, amplifier 82 feeds back through the PT so that its output is at approximately 3 volts or less. Since the saturated amplifiers are at +15 volts then diodes 71 and 73 are off and only the unsaturated amplifier's diode 70 is on. Therefore the combined output of the concatenated receiver blocks will be proportional to the lowest of all of the diode cathode inputs so that the combined circuit will output only the selected amplifier/PT. In this way a number of the multiple PT receivers can be multiplexed onto a single analog line.

Figure 11:
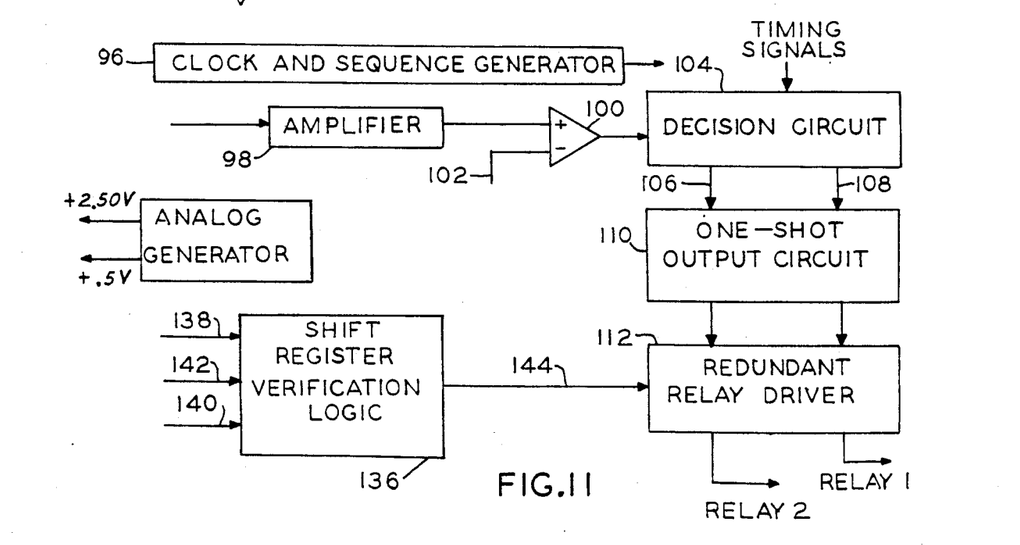
FIG. 11 is a more detailed schematic block diagram of the logic circuit of FIG. 2.

The major subcomponents of the logic circuit 18 are illustrated in the block diagram of FIG. 11. The following principal functions are performed by the logic circuit: a) it amplifies the data-out signals coming in from the light receivers, b) it sequences the light transmitters with the light receivers, c) it supplies reference voltages to other subcircuits, and d) it verifies the shift register logic. The circuit includes a clock sequence generator 96 which produces timing signals used in the system. The clock speed can be in the range of 2 $\mu$s to 1000 $\mu$s depending upon the application. A clock speed of 100 $\mu$s is suitable for the preferred embodiment. The data-in signals from the receivers are amplified in circuit 98, the output of which is directed into comparator 100. The individual outputs from each receiver are compared against a voltage threshold provided at 102. The output from the comparator is analyzed by decision circuit 104. The decision circuit generates relay drive signals 106, 108 when the signal from a given receiver exceeds the threshold, indicating that the PT of a particular channel has received light. The relay drive signals are fed into a one-shot output circuit 110 and then into a redundant relay driver circuit 112. The relay driver circuit supplies the output relays 114, 116, shown in FIG. 12, with signals so that the relays remain energized as long as every channel has the correct output indicating that it is receiving light and is working.

Figure 12:
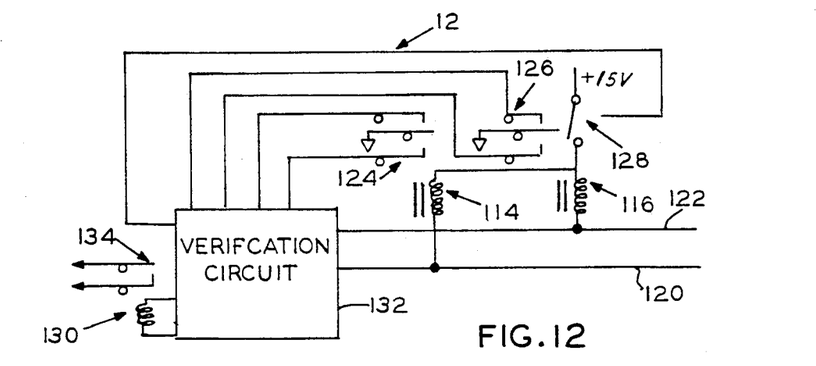
FIG. 12 is a more detailed schematic diagram of the relay operate/check circuit of FIG. 2.

The relay operate/check circuit 20 is shown in detail at FIG. 12 and includes a plurality, shown as two, of the output relays 114, 116 connected with lines 120, 122 through which the drive signals are received from relay driver 112. Each relay includes two sets of contacts. One set of contacts 124 and 126 for each relay are shown in FIG. 12 and the other set, not shown, are employed by the user for the appropriate end use application, e.g. triggering an alarm, energizing a light bulb or controlling machinery. The circuit operates to verify that the relay contacts agree with each other, agree with their respective drive signals, and that both drive signals agree. If any of these conditions are not met for more than ten milliseconds, the switch 128 is opened which disables the output relays, thereby putting them in a safe state. A flipflop stores the failed state condition until a reset button, which is a part of verification circuit 132, is pushed, or until power is restored. If the failure persists then the circuit again opens switch 128. An auxiliary output is comprised of relay 130 and its drive circuit, which is a part of verification circuit 132, which operate to close an externally available contact pair 134 for triggering the alarm or the like in the event that any of the failures have been detected. This relay is only reset when the entire verification circuit is reset.

Decision circuit 104 operates to verify that the selected channel is not detecting light until the associated LED is turned on, and that it is detecting light when the LED flashes on. If either of these conditions are not met, the one-shot output circuit 110 is triggered and the output relays are de-energized to the "detect object" condition.

Figure 13:
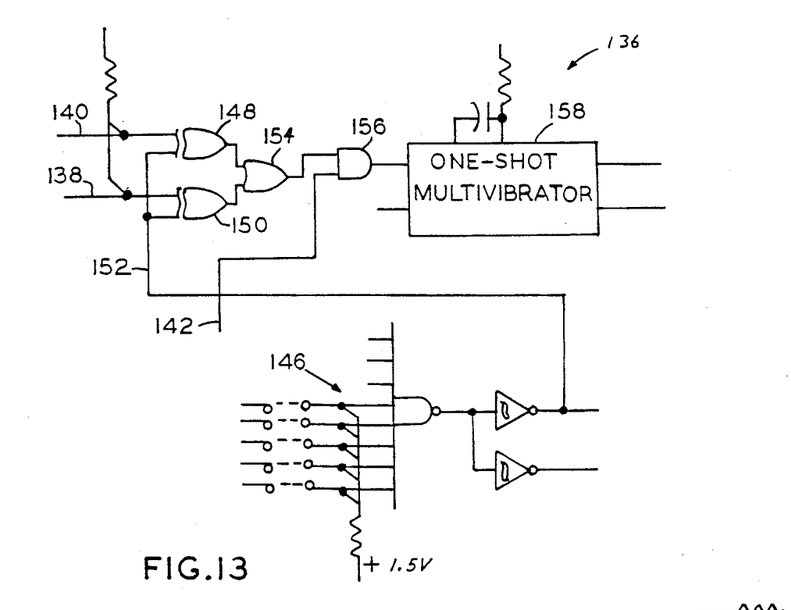
FIG. 13 is a more detailed schematic diagram of the shift register verification logic circuit of FIG. 11.

Shift register verification logic circuit 136 of the logic circuit of FIG. 11 is shown in detail in FIG. 13. This circuit 136 receives the data-out signals, which are binary coded information, from both the receiver data line 138 and transmitter data line 140, and also receives timing signals on line 142 from the clock sequence generator. At each clock signal the verification logic determines if the correct sequence of data bits is coming out of the individual shift registers from both of the transmitter and receiver lines. If at any time the actual data-out signals from the transmitters or receivers do not agree with the clock sequence data, then the verification circuit sends a shutdown signal through line 144 (FIG. 11) into redundant relay driver 112 which signals the relays into the shutdown mode.

In the verification logic circuit of FIG. 13 the user installs jumpers across the appropriate jumper contacts 146 in accordance with the desired number of channels installed in the system. This in turn establishes the number of stages that are in the shift registers between data-in and data-out. This permits the logic circuit to make an appropriate comparison between the data-out information from the shift registers.

The data-out line 140 from the transmitter circuit leads into one contact of exclusive OR gate 148, and the data-out line 138 from the receiver circuit is connected with one contact of a second exclusive OR gate 150. The exclusive OR gates compare the sequence generator data stream to the actual data stream coming in on line 152 from the shift registers of the transmitter and receiver. The outputs from these exclusive OR gates continue through OR gate 154 and AND gate 156, the output of which leads into a one-shot monostable multivibrator 158. When the signals disagree, multivibrator 158 is triggered to disable the relays. Line 142 is used to clear and reset the logic so that minor timing variations do not trigger the circuit.

During operation, both the transmitter and receiver shift registers inject a "one" bit at the start of each scanning cycle of the light curtain, and the activated transmitter/receiver channel is determined by the point in the shift register where this "one" bit is located. When the shift register shifts this "one" bit through the complete cycle, it appears at the data-out line of the shift register. The verification logic circuit checks to make sure that this "one" bit comes out exactly after the correct number of shifts, and that no "one" bit comes out of the shift register at any other time. If the shift register, or any wiring, fails, the circuit will either put out a "one" bit at the wrong time or put out a "0" when the "one" should come out. In either event the relays are opened and the system shuts down.

Figure 14:
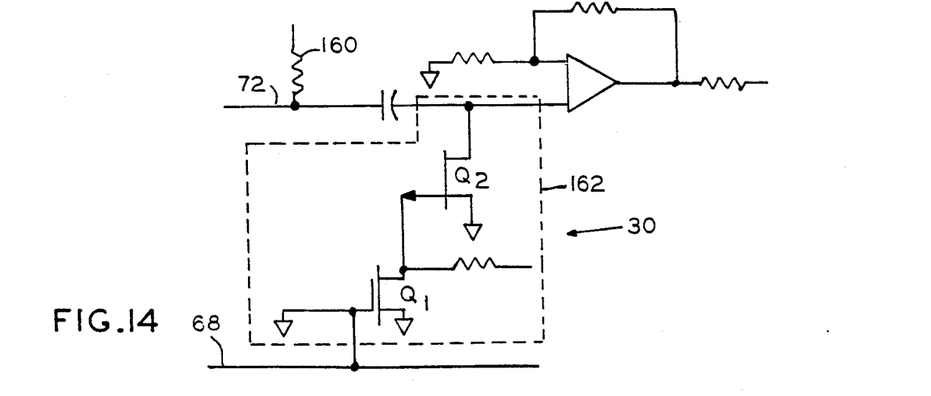
FIG. 14 is a more detailed schematic diagram of the amplifier/interface circuit of FIG. 2.

FIG. 14 illustrates components of the amplifier/interface circuit 30 which conditions the signals for going over a long cable. The amplifier/interface circuit includes a pull-up resistor 160 which applies a positive signal to the anodes of all of the diodes 70, 71, 73 of the output multiplexing circuit described in connection with FIG. 10. The pull-up resistor makes the cathode of the appropriate diode the most negative so that the circuit will output only from the selected PT.

Amplifier/interface circuit 30 functions to buffer the analog line, to increase the signal strength sufficient to travel over a long cable, and removes all steady-state signals from the PT amplifiers which result from such conditions as ambient light, Vbe drop, the +2.5 volt amplifier offset, diode drop and the like. This DC component is removed from each channel during a cycle before the channel's signal is interrogated by the remainder of the circuit. This is accomplished by closing the DC restore switch circuit, which is comprised of the components enclosed by the dashed line 162, during a period when no LED light is arriving at a selected PT. The DC restore switch is closed by a signal from logic circuit 18.

Figure 15:
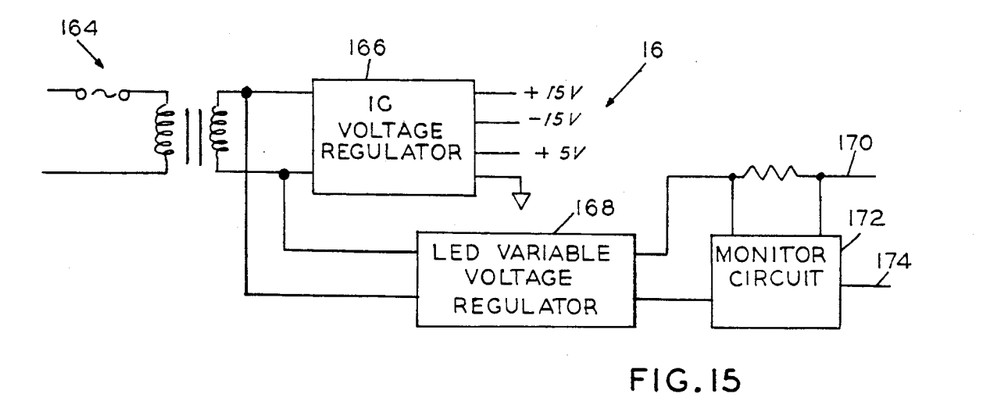
FIG. 15 is a schematic block diagram of the power supply circuit of FIG. 2.

The components of power supply circuit 16 are illustrated in FIG. 15. The 60 Hz main line connects with a transformer 164 which is coupled with IC voltage regulator 166. The LED variable voltage regulator 168 supplies voltage to the +LED power control line 170. A monitor circuit 172 functions as a current and voltage over-limit detector which provides a relay shutdown signal through line 174 to the logic circuit if the voltage or current go too high. This circuit thereby insures that the system is in a safe mode if there is any type of power failure.

Figure 16:
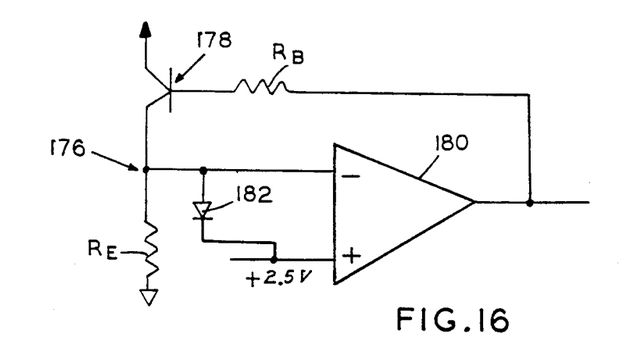
FIG. 16 is a detailed schematic diagram of receiver circuit components in an embodiment providing faster overdrive and select recovery functions.

FIG. 16 shows an alternate embodiment of an individual PT receiver array 176 which provides a faster overdrive and select recovery capability. The base of PT 178 is connected with the output of an amplifier 180, and a diode 182 is connected between the plus and minus inputs of the amplifier. This circuit configuration increases the speed at which the PT can be selected. When a PT goes out of the de-select mode and into the selected mode then a discrete time is required for its photosensitivity to recover. When the PT is selected by the logic circuit it causes very high emitter currents which sweep the charge rapidly out of the device. When selected the PT then peaks at very high currents in a relatively short time.

In the method of operation of the invention with the control circuits powered up logic circuit 18 operates the LED transmitter circuit 24 and PT receiver circuit 28 for scanning of the light channels in sequence across the zone to be protected. The LEDS are activated in sequence to strobe light exclusively addressed for a given channel. The PTs are selected by the logic circuit to detect light at the time in the cycle which corresponds to the appropriate channel being strobed.

The PTs are selected by the logic circuit applying a +5 volt signal to the collector. When light which is emitted from the LED transmitter of the same channel strikes the selected PT, then less current is supplied to the base by the amplifier loop because the light provides a portion of the base current. The loop then holds the collector current constant to produce the light detection signal.

Each PT is de-selected when the logic circuit grounds its collector. The de-selected PT no longer operates as a transistor but rather as a virtual diode pair in series as illustrated by FIGS. 8 and 9. The grounding of the collector forward biases the virtual diode on the base-collector junction, thereby eliminating the device's photosensitivity and dragging the base to approximately 0.6 volts from ground. With the amplifier input at 2.5 volts the virtual diode on the base-emitter junction is reversed-biased and off, carrying substantially no current. This condition effectively disconnects the PT from the inverting input of the amplifier. If any other PT is enabled by being selected, then all of the de-selected PTs are completely out of the circuit so that the amplifier output reflects only the light which strikes a PT that is selected.

The single amplifier for each receiver block, e.g. amplifier 82 of FIG. 6, provides the analog output signal through diode 70. The signal is directed through amplifier/interface circuit 30 and into logic circuit 18. The analog signals from the PT receivers are processed in the logic circuit through amplifier circuit 98, comparator circuit 100 and decision circuit 104. When these circuits determine that light is present in the proper channel at the proper time in the cycle, the relay drive signals signal one-shot output circuit and redundant relay driver 112. At the same time the receiver data-out signals, transmitter data-out signals and timing signals are processed by shift register verification logic circuit 144. If this circuit determines that the actual data-out signals from the transmitter and receiver shift register agree with the signals from the clock sequence generator, then no shutdown signal is generated and the system continues into the next cycle of light sequencing through the channels. If the verification logic senses a disagreement between the transmitter/receiver data-out signals and the clock sequence generator signals, a shutdown signal is directed into relay driver 112 to safe out the relays. The relays in turn activate the appropriate alarm or shut down the machinery which is being safeguarded.

While the foregoing embodiments are at present considered to be preferred it is understood that numerous variations and modifications may be made therein by those skilled in the art as fall within the true spirit and scope of the invention.

What is claimed is:

1. For use in a light curtain system having a light transmitter which sequentially strobes light beams across a zone to be protected and a light receiver having a plurality of phototransistors arrayed to receive the light beams, said phototransistors each having a base, a collector and an emitter, the improvement including control circuit means for selecting the sequence in which the phototransistors are enabled to produce output signals upon receiving light beams from the light transmitter, said control circuit means including shift register means for applying a voltage to the collector of a selected phototransistor sufficient to enable the phototransistor to generate an output signal responsive to incident light, said shift register means de-selecting said phototransistor by grounding the collector at the time that the light transmitter is not strobing light in the channel of the de-selected phototransistor, said circuit means including amplifier means for receiving and amplifying output signals from the phototransistors which are selected and which receive light from the transmitter.

2. Control circuit means as in claim 1 in which said amplifier means includes a single operational amplifier which amplifies the output signals from a plurality of the phototransistors, said amplifier means further including loop circuit means for coupling the operational amplifier with the base of the transistor of each phototransistor, said loop circuit means responding to voltage applied to the collector of a selected phototransistor and directing a voltage signal through the base of the selected phototransistor to achieve rapid response in amplifying the output signal.

3. Control circuit means for a light curtain system as in claim 1 which includes means for de-selecting a phototransistor by grounding its collector and thereby eliminating photosensitivity of the de-selected phototransistor whereby no output signal is generated by the de-selected phototransistor upon receiving incident light.

4. Control circuit means as in claim 1 in which said amplifier means includes at least one operational amplifier having first and second input terminals and an output terminal, said circuit means including means for coupling the emitter of the phototransistor with said second output terminal to provide a feedback loop signal to the operational amplifier, and resistance means for coupling the base of the phototransistor with said output terminal whereby upon light hitting a phototransistor at the time it is selected by said voltage being applied to its collector a high response of the operational amplifier is achieved with its output voltage dropping proportional to the light input.

5. A light curtain system for detecting the intrusion of objects into a zone to be protected, said system comprising the combination of light transmitting means for sequentially strobing light beams in a plurality of channels projecting along predetermined paths across said zone, light receiving means for sensing the presence of the light beams in the channels, control means for controlling operation of the light receiving means in coordination with operation of the light transmitting means, said light receiving means comprises a plurality of phototransistors each of which includes a base, a collector and an emitter, said control circuit means includes shift register means for selecting a phototransistor in said given channel to enable it to generate an output signal when it receives incident light, said shift register means applying a voltage to the collector of the selected phototransistor sufficient to cause the phototransistor to generate an output signal responsive to incident light, said shift register means de-selecting said phototransistor to grounding its collector with the phototransistor thereby functioning as a pair of virtual diodes in series with no output signal being generated responsive to incident light, and relay means for generating a detection signal responsive to said light receiving means sensing a light beam in a given channel at the time said shift register means selects the phototransistor associated with the given channel.

6. A light curtain system as in claim 5 in which said shift register means applies the voltage to said phototransistor collectors in a predetermined sequence which corresponds to the sequence in which said light means strobes the light beams addressed to the given channels.

7. A light curtain system as in claim 5 in which said control circuit means includes means for applying a voltage to the collector sufficient to cause the phototransistor to generate an output signal responsive to incident light, said control circuit further circuit including amplifier means having a minus input connected with the emitter of the phototransistor, a plus input, and an output connected with the base of the phototransistor, said control circuit further including diode means having its anode connected with said minus input and its cathode connected with said plus input for rapidly sweeping currents from the phototransistor and decreasing its photosensitivity recovery time to provide faster select recovery capability.

8. A light curtain system as in claim 5 in which said control circuit means includes amplifier means connected to receive feedback signals from the emitters of at least two of said phototransistors, together with circuit means for connecting the bases of at least said two phototransistors in parallel and with the output of said amplifier means, said amplifier means amplifying the output signals only from selected phototransistors which receive incident light.

9. A light curtain system as in claim 8 in which said light receiver means includes a concatenation of at least two receiver block means, each receiver block means including one of said amplifier means together with a plurality of said phototransistors and resistor means for connecting said bases in parallel with the output of the amplifier means associated with the respective block, each block including a diode having its cathode connected with the output of the associated amplifier, and circuit means for connecting the anodes of said diodes of each block in parallel to provide a combined output signal which is proportional to the lowest signal applied to the cathode inputs of said diodes, whereby the combined output from the concatenation of receiver blocks reflects the condition of only the selected phototransistor.

* * * * *

REEXAMINATION CERTIFICATE (2536th)
United States Patent [19]
Blau

[11] B1 5,015,840
[45] Certificate Issued Apr. 11, 1995

[54] SELF-CHECKING LIGHT CURTAIN SYSTEM AND METHOD OF OPERATION

[75] Inventor: David Blau, Cupertino, Calif.

[73] Assignee: Scientific Technologies Incorporated, Hayward, Calif.

Reexamination Request:
No. 90/003,520, Aug. 5, 1994

Reexamination Certificate for:
Patent No.: 5,015,840
Issued: May 14, 1991
Appl. No.: 463,240
Filed: Jan. 9, 1990

[51] Int. Cl.$^6$ ............................................... G01V 9/04
[52] U.S. Cl. .................................. 250/221; 250/208.3; 250/222.1; 340/556
[58] Field of Search ................. 250/208.3, 208.4, 221, 250/222.1; 340/555–557

[56] References Cited
FOREIGN PATENT DOCUMENTS

| | | |
|---|---|---|
| 2023282 | 12/1979 | United Kingdom . |
| 2177503 | 1/1987 | United Kingdom . |
| 2192711 | 1/1988 | United Kingdom . |

Primary Examiner—Stephone B. Allen

[57] ABSTRACT

A light curtain system and method of operation which detects the intrusion of objects into a protected zone. The system is characterized in having an inherent self-checking mode of operation by logic circuits which analyze data signals from both the LED light transmitters and phototransistor receiver circuits. A shutdown signal is generated if the logic circuit determines that light is not received in a selected channel at the time that the LED is strobing light exclusively for that channel. The system further provides a relatively simple and inexpensive method of selecting and amplifying the LED transmitters and PT receivers. In the circuit each PT acts as a switch which selects itself, and a single amplifier is employed for a plurality of the channels. The circuit further provides for the concatenation of groups of amplifier/PT circuits into a longer chain using a single diode.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *

REEXAMINATION CERTIFICATE (2907th)
United States Patent [19]
Blau

[11] B1 5,015,840
[45] Certificate Issued  Jun. 11, 1996

[54] SELF-CHECKING LIGHT CURTAIN SYSTEM AND METHOD OF OPERATION

[75] Inventor: David Blau, Cupertino, Calif.

[73] Assignee: Scientific Technologies Incorporated, Hayward, Calif.

Reexamination Request:
No. 90/003,978, Sep. 26, 1995

Reexamination Certificate for:
Patent No.: 5,015,840
Issued: May 14, 1991
Appl. No.: 463,240
Filed: Jan. 9, 1990

[51] Int. Cl.$^6$ .................................................. G01V 9/04
[52] U.S. Cl. .............. 250/221; 250/208.3; 250/222.1; 340/556
[58] Field of Search ................... 250/208.3, 208.4, 250/221, 222.1; 340/555–557

[56] References Cited

U.S. PATENT DOCUMENTS

| | | |
|---|---|---|
| 3,764,813 | 10/1973 | Clement et al. . |
| 3,805,061 | 4/1974 | De Missimy . |
| 5,015,840 | 5/1991 | Blau . |

FOREIGN PATENT DOCUMENTS

| | | |
|---|---|---|
| 234909 | 9/1987 | European Pat. Off. . |
| 253678 | 1/1988 | European Pat. Off. . |
| 023282 | 12/1979 | United Kingdom . |
| 177503 | 1/1987 | United Kingdom . |
| 192711 | 7/1987 | United Kingdom . |

*Primary Examiner*—Stephone Allen

[57] ABSTRACT

A light curtain system and method of operation which detects the intrusion of objects into a protected zone. The system is characterized in having an inherent self-checking mode of operation by logic circuits which analyze data signals from both the LED light transmitters and phototransistor receiver circuits. A shutdown signal is generated if the logic circuit determines that light is not received in a selected channel at the time that the LED is strobing light exclusively for that channel. The system further provides a relatively simple and inexpensive method of selecting and amplifying the LED transmitters and PT receivers. In the circuit each PT acts as a switch which selects itself, and a single amplifier is employed for a plurality of the channels. The circuit further provides for the concatenation of groups of amplifier/PT circuits into a longer chain using a single diode.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–9 is confirmed.

* * * * *